Figure 1:
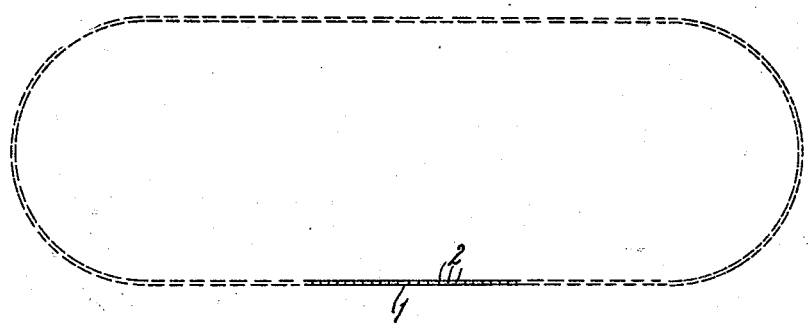

July 29, 1924.

C. L. ERICSON 1,503,310

BAND SAW JOINT AND METHOD OF MAKING THE SAME

Filed June 28, 1923

Carl L. Ericson, INVENTOR.

BY

Frank A. Cutter, ATTORNEY.

Patented July 29, 1924.

1,503,310

UNITED STATES PATENT OFFICE.

CARL L. ERICSON, OF LONGMEADOW, MASSACHUSETTS, ASSIGNOR TO AMERICAN SAW AND MANUFACTURING COMPANY, OF SPRINGFIELD, MASSACHUSETTS, A CORPORATION OF MASSACHUSETTS.

BAND-SAW JOINT AND METHOD OF MAKING THE SAME.

Application filed June 28, 1923. Serial No. 648,208.

*To all whom it may concern:*

Be it known that I, CARL L. ERICSON, a subject of the King of Sweden, residing at Longmeadow, in the county of Hampden and State of Massachusetts, have invented a new and useful Band-Saw Joint and Method of Making the Same, of which the following is a specification.

My invention relates to improvements in means for connecting or joining permanently the ends of band saws, and also in methods of so joining such ends, and consists in cutting the ends of a band saw obliquely and in the same direction so that said ends can be brought together in a manner to provide continuity of each longitudinal edge of said saw, in thus bringing said ends together and butt welding them, and in grinding off the excess metal which is thrown up or exuded on both sides of the saw during the welding operation, whereby a band-saw joint is produced which is oblique to the edges of the saw, and the weakened portions of the saw on both sides of the weld are also oblique to said edges, all as hereinafter set forth.

Heretofore it has been customary to join the ends of a band saw by brazing or butt welding, after cutting such ends at right-angles to the longitudinal edges of the saw, the joint itself then being only equal in length to the width of the saw, and in consequence of which the saw is very liable to break at or adjacent to the brazed or welded part, and the primary object of my invention is to produce a joint in a band saw which joint is of sufficient strength and durability to meet the demands placed upon the same and to withstand the strain to which it is subjected.

Band saws are made up of cold-rolled, carbon-tool steel, and, when such steel is subjected to the intense heat involved in the butt-welding process, certain molecular changes take place on both sides of the weld itself which weakens the steel at such points, with the result that, if the weld be at right-angles to the longitudinal edges of the saw, the latter is quite liable to and frequently does break on one or the other or possibly both sides of said weld, and it is to prevent this breakage of the saw at or adjacent to the joint that the present invention has been made. By making the weld in the band saw oblique to the longitudinal edges of said saw, the length of the weld is increased over that of a weld at right-angles to such edges, and the weakened portions of the saw on both sides of the oblique weld are also longer, consequently the bending action produced on the joint and parts adjacent thereto, when they come into contact and while they remain in contact with the rolls which support and carry the saw, is distributed over or through a greater area or length than is the case when the joint and weakened portions are at right-angles to said longitudinal edges. Inasmuch as the butt-welded joint itself practically never breaks, but only the portions of the saw which are adjacent to said joint and have been weakened by the butt-welding operation, as previously stated, the shorter joint can not assume in part the contour of the saw-carrying rolls when it passes in contact therewith, and the short weakened portions of the saw adjacent to said joint are not of sufficient length or proper shape to avoid undue strain when they pass in contact with said rolls, hence the tendency to break. When my joint passes in contact with any roll there is never a time when the weakened part or parts of the saw are in contact with such roll without there being at the same time a portion of the unweakened part of the saw or the joint or a portion of the latter also in contact with the roll, while with the old type a weakened portion of the saw is at times in contact with the roll without being reenforced or augmented as it were either by any part of the weld or any portion of the unweakened part of the saw. Moreover, the resistance of the saw, having its ends connected with my joint, to direct longitudinal pull or strain is greater than in the case where the joint is at right-angles to the longitudinal edges of the saw, as must necessarily be so because of the greater length of the weld and the positions in the saw of the weld and the weakened portions in the saw, even though such weakened portions are or may be of greater area than corresponding portions in a saw having its ends connected by a weld which is at right-angles to the longitudinal edges thereof. In the present case the unweakened portion of the saw is oblique at its ends, and extends beyond or over and under the terminal portions of the weld, instead of being perpendicular and extending toward the weld in rectangular form.

The brazed joint is too weak to be satisfactory.

Other objects and advantages will appear in the course of the following description.

I attain the objects and secure the advantages of my invention in part by the means illustrated in the accompanying drawings, in which—

Figure 2:
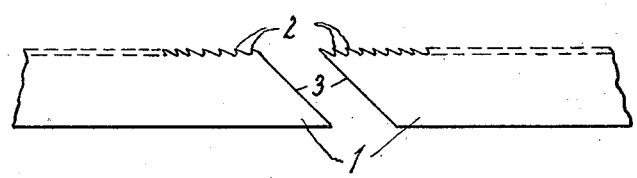

Figure 1 is a top plan of a band saw which is assumed to embody a practical form of the joint produced by the method of my invention, the greater portion of such saw being represented by broken lines; Fig. 2, an enlarged, side elevation of the adjacent end portions of said saw prior to the butt-welding operation, and, Fig. 3, a similar elevation after the butt-welding operation has taken place.

Similar reference characters designate similar parts throughout the several views.

Figure 3:
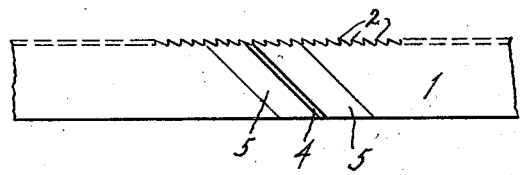

In Fig. 3 the joint and the weakened places in the saw are outlined to assist in explaining the same and the method of producing the joint, but, in practice, after the joint and adjacent parts have been ground, polished, and finished, any joint or other lines that are discernible are very indistinct, and there may be more or less irregularity in the same, or, in other words, such lines may not be exactly straight as they appear in the drawing.

A band saw is represented in the drawings at 1, such saw having teeth 2 on one longitudinal edge thereof. The ends of the saw are cut in the same direction at an angle which is oblique to the longitudinal edges of said saw, such angle preferably being one of approximately forty-five degrees. The obliquely-cut ends of the saw 1 are represented at 3 in Fig. 2. These ends are brought together and butt welded to form a joint substantially like that represented at 4 in Fig. 3. In the butt-welding operation the steel of the saw for a short distance each side of the joint or weld 4 is changed or undergoes a change which weakens the same. These weakened portions of the saw are represented at 5—5 in Fig. 3, although as previously intimated such representation is merely suggestive inasmuch as the weakened areas of the saw vary more or less in extent, and there is a greater or less amount of irregularity in their outlines or in the edges of such areas which merge into the unweakened part of the saw.

After the ends of the saw are butt-welded together, the oblique ridges of metal formed at the time of welding on opposite sides of the saw are ground off, and the saw is polished and finished at the joint.

It is clear from the foregoing that the saw provided with the oblique, butt-welded joint not only is strong and durable, and not liable to break at or adjacent to said joint, but the latter in no way interferes with or decreases the facility with which the saw can be carried on and driven by its rolls, or with the cutting operation or efficiency generally and specifically of the saw.

No more difficulty is experienced by the longer, oblique, butt-welded joint in conforming to and passing in contact with the saw-carrying rolls than is experienced by the shorter, perpendicular joint. The former conforms to the curvature of the rolls just as does the other portions of the saw.

Although it is believed that the best results are attained when the joint 4 is at an angle of forty-five degrees to the longitudinal edges of the saw, I do not desire or intend to limit myself to such angle, because the joint may have some other angle provided the same be not a right-angle.

This joint is elementally homogeneous inasmuch as it is made by melting and fusing together the cut ends of the saw, without introducing extraneous metal, or employing rivets or an overlapping part or member.

What I claim as my invention, and desire to secure by Letters Patent, is—

1. In a band saw, a butt-welded elementally homogeneous joint which is oblique to the longitudinal edges of the saw, whereby is produced a long and proportionately strong joint, with a comparatively large distribution of the weakened parts of the saw adjacent to said joint.

2. The method of making a joint in a band saw, consisting in cutting through the entire thickness of the metal without offset and obliquely to the longitudinal edges of the saw, and in bringing the ends thus formed together and butt-welding them.

3. The method of making a joint in a band saw consisting in cutting through the entire thickness of the metal without offset and obliquely to the longitudinal edges of the saw, in bringing together the obliquely-cut ends thus formed without lateral overlap, in butt-welding said ends, and in removing the surplus material from the sides of the saw at the butt-welded joint therein.

CARL L. ERICSON.

Witnesses:
F. A. CUTTER,
C. C. WEST.